US005907626A

United States Patent [19]
Toklu et al.

[11] Patent Number: 5,907,626
[45] Date of Patent: May 25, 1999

[54] METHOD FOR OBJECT TRACKING AND MOSAICING IN AN IMAGE SEQUENCE USING A TWO-DIMENSIONAL MESH

[75] Inventors: Candemir Toklu; A. Tanju Erdem; A. Murat Tekalp, all of Rochester, N.Y.

[73] Assignee: Eastman Kodak Company, Rochester, N.Y.

[21] Appl. No.: 08/904,875

[22] Filed: Aug. 1, 1997

Related U.S. Application Data

[60] Provisional application No. 60/023,208, Aug. 2, 1996, and provisional application No. 60/037,322, Feb. 7, 1997.

[51] Int. Cl.$^6$ .................................................. G06K 9/00
[52] U.S. Cl. ........................................... 382/107; 382/284
[58] Field of Search ........................... 382/107, 236, 382/284, 294; 348/407, 415; 345/433, 435, 474, 475

[56] References Cited

U.S. PATENT DOCUMENTS

| 4,783,833 | 11/1988 | Kawabata et al. | 382/22 |
|---|---|---|---|
| 5,262,856 | 11/1993 | Lippman et al. | 358/136 |
| 5,280,530 | 1/1994 | Trew et al. | 382/1 |
| 5,617,482 | 4/1997 | Brusewitz | 382/107 |
| 5,649,032 | 7/1997 | Burt et al. | 382/284 |
| 5,657,402 | 8/1997 | Bender et al. | 382/294 |

OTHER PUBLICATIONS

"Snakes: Active Contour Models" by Michael Kass, Andrew Witkin and Demetri Terzopoulos, *International Journal of Computer Vision*, vol. 1, No. 4, pp. 321–331, 1988.

"Tracking Deformable Objects in the Plane Using an Active Contour Model" by Freédéric Leymarie and Martin D. Levin, *IEEE Transactions Pattern Analysis and Machine Intelligence*, vol. 15, No. 6, pp.617–634, Jun. 1993.

"Motion tracking of Deformable Objects by Active Contour Models Using Multiscale Dynamic Programming", by Kouta Fujimura, Noakazu Yokoya and Kazuhiko Yamamoto, *Journal of Visual Communication and Image Representation*, vol. 4, No. 4, pp. 382–391, Dec. 1993.

"Tracking Complex Primitives in an Image Sequence", by Benedicte Bascle, Patrick Bouthemy, Rachid Deriche and Francois Meyer, *IEEE International Conference Pattern Recognition*, pp.426–431, Oct. 1994.

"Region–Based Tracking Using Affine Motion Models in Long Image Sequences", by Francois G. Meyer and Patrick Bouthemy, *CVGIP: Image Understanding*, vol. 60, No. 2, pp.119–140, Sep. 1994.

"A Novel Video Coding Scheme Based on Temporal Prediction Using Digital Image Warping", Jacek Nieweglowski, T. George Campbell and Petri Haavisto, *IEEE Transactions Consumer Electronics*, vol. 39 No. 3, pp.141–150, Aug. 1993.

(List continued on next page.)

*Primary Examiner*—Andrew W. Johns
*Attorney, Agent, or Firm*—Peyton C. Watkins

[57] ABSTRACT

A method for motion tracking and constructing a mosaic of video objects is disclosed. Also disclosed is a method for synthetic object transfiguration from a mosaic. A 2-D triangular mesh is employed to represent a video object, which permits to describe the motion of the object by the displacements of the node points of the mesh, and to describe any intensity variations by the contrast and brightness parameters estimated for each node point. Using the temporal history of the node point locations, the nodes of the 2-D mesh are continued to be tracked even when they become invisible because of self-occlusion or occlusion by another object. By adding new nodes or updating the 2-D triangular mesh, any uncovered parts of the video object are incrementally added to the mosaic. A finite number of views representing the constructed mosaic are selected and used for synthetic transfiguration of a replacement object in place of the original one.

22 Claims, 11 Drawing Sheets

OTHER PUBLICATIONS

"Motion Compensation Based on Spatial Transformations", by Yuichiro Nakaya and Hiroshi Harashima, *IEEE Transaction Circuits and System Video Technology*, vol. 4 No. 3, pp. 339–357, Jun. 1994

"Object–Oriented Motion Estimation", by M. Dudon, O. Avaro and G. Eude, *Picture Coding Symposium*, pp. 284–287, Sep. 1994, CA.

"A New Motion Compensation Method for Image Sequence Coding Using Hierarchical Grid Interpolation", by Chung-Lin Huang and Chao–Yuen Hsu, *IEEE Transactions Circuits and System Video Technology*, vol. 4, No.1, pp. 42–52, Feb. 1994.

"Closed–Form Connectivity–Preserving Solutions for Motion Compensation Using 2–D Meshes", by Yucel Altunbasak and A. Murat Tekalp, *IEEE Transactions on Image Procesing*, vol.6. No. 9, Sep. 1997, pp. 1255–1269.

"Very Low Bitrate Video Coding Using Object–Based Mesh Design and Tracking", by Yucel Altunbasak and A. Murat Tekalp, *SPIE/IS&T Symposium on Electronic Imaging Science and Technology*, San Jose, California, Feb. 1996, pp.28–33.

"Occlusion–Adaptive, Content–Based Mesh Design and Forward Tracking", by Yucel Altunbasak and A. Murat Tekalp, *IEEE Transactions on Image Processing*, vol. 6, No. 9, Sep. 1997, pp.1270–1280.

"Efficient Representations of Video Sequences and Their Applicaitons", by Michal Irani, P. Anandan, Jim Bergen, Rakesh Kumar, Steve Hsu, *Signal Processing: Image communication*, vol. 8, pp.327–351. 1996.

METHOD FOR OBJECT TRACKING AND MOSAICING IN AN IMAGE SEQUENCE USING A TWO-DIMENSIONAL MESH

CROSS REFERENCE TO RELATED APPLICATION

Reference is made to and priority claimed from U.S. Provisional application Ser. No. US Provisional 60/023,208, filed Aug. 2, 1996, entitled METHOD FOR TWO-DIMENSIONAL-MESH-BASED MOSAICKING AND TRACKING OF AN OBJECT IN AN IMAGE SEQUENCE and from U.S. Provisional 60/037,322, filed Feb. 7, 1997, entitled DIGITAL IMAGE OBJECT TRACKING METHOD.

FIELD OF THE INVENTION

The present invention is related to the field of digital video processing and analysis, and more specifically, to a technique for mosaicing and tracking a particular video object in two-dimensional images that are sequentially placed in chronological order for display.

BACKGROUND OF THE INVENTION

In a wide variety of image sequence processing and analysis tasks, including object-based video manipulation, there is a great need for an accurate method for tracking the boundary, motion, and intensity of a video object throughout an image sequence. The video object may be only partially visible in each frame of the image sequence because of self occlusion, or occlusion by another video object.

Tracking the boundary of an object has been discussed in M. Kass, A. Witkin, and D. Terzopoulos, "Snakes: Active Contour Models", *International Journal of Computer Vision*, volume 1, no. 4, pp. 321–331, 1988; F. Leymarie and M. Levine, "Tracking Deformable Objects in The Plane Using An Active Contour Model", *IEEE Transactions Pattern Analysis and Machine Intelligence*, volume 15, pp. 617–634, June 1993; K. Fujimura, N. Yokoya, and K. Yamamoto, "Motion Tracking of Deformable Objects By Active Contour Models Using Multi-scale Dynamic Programming", *Journal of Visual Communication and Image Representation*, vol. 4, pp. 382–391, December 1993; B. Bascle, et al., "Tracking Complex Primitives in An Image Sequence", in *IEEE International Conference Pattern Recognition*, pp. 426–431, October 1994, Israel; F. G. Meyer and P. Bouthemy, "Region-Based Tracking Using Affine Motion Models in Long Image Sequences", *CVGIP: Image Understanding*, volume 60, pp. 119–140, September 1994. The methods disclosed therein, however, do not address the tracking of the local deformations within the boundary of the object.

Methods for tracking local deformations of an entire frame using a 2-D mesh structure are disclosed in J. Niewglowski, T. Campbell, and P. Haavisto, "A Novel Video Coding Scheme Based on Temporal Prediction Using Digital Image Warping", *IEEE Transactions Consumer Electronics*, volume 39, pp. 141–150, August 1993; Y. Nakaya and H. Harashima, "Motion Compensation Based on Spatial Transformations", *IEEE Transaction Circuits and System Video Technology*, volume 4, pp. 339–357, June 1994; M. Dudon, O. Avaro, and G. Eud; "Object-Oriented Motion Estimation", in *Picture Coding Symposium*, pp. 284–287, September 1994, CA; C.-L. Huang and C.-Y. Hsu, "A New Motion Compensation Method for Image Sequence Coding Using Hierarchical Grid Interpolation", *IEEE Transactions Circuits and System Video Technology*, volume 4, pp. 42–52, February 1994; Y. Altunbasak and A. M. Tekalp, "Closed-form connectivity-preserving solutions for motion compensation using 2-D meshes," *IEEE Transactions on Image Processing*, volume 6, no. 9, September 1997. However, these methods always include the whole frame as the object of interest. They do not address the problem of tracking an individual object within the frame.

U.S. Pat. No. 5,280,530, which is herein incorporated by reference, discusses a method for tracking an object within a frame. This method employs a single spatial transformation (in this case affine transformation) to represent the motion of an object. It forms a template of the object, divides the template into sub-templates, and estimates the individual displacement of each sub-template. The parameters of the affine transformation are found from the displacement information of the sub-templates. Although this method employs local displacement information, it does so only to find a global affine transformation for representing the motion of the entire object. Therefore, while it tracks the global motion of an entire object, it cannot track any local deformations that occur within the object.

The method disclosed in commonly assigned U.S. patent application Ser. No. 08/636,622 entitled "Tracking Motion and Intensity Variations Using Hierarchical 2-D Mesh Modeling," *Graphical Models and Image Processing*, volume 58, no. 6, pp. 553–573, November 1997, which are herein incorporated by reference, tracks the boundary, local motion, and intensity variations of a video object throughout an image sequence. It also describes how 2-D mesh-based object tracking can be used for object-based video manipulation such as synthetic object transfiguration and augmented reality. However, this method assumes that the object being tracked is not occluded throughout the image sequence.

A method for occlusion-adaptive tracking of video objects using 2-D meshes is discussed in Y. Altunbasak and A. M. Tekalp, "Very low bit rate video coding using object-based mesh design and tracking," *SPIE/IS&T Symposium on Electronic Imaging Science & Technology*, San Jose, Calif., February 1996; Y. Altunbasak and A. M. Tekalp, "Occlusion-adaptive content-based 2-D mesh design and tracking for object-based coding," *IEEE Transactions on Image Processing*, volume 6, no. 9, September 1997. However, this method is developed for the purpose of video-object compression and is capable of tracking frame-to-frame motion of the video object only. It does not provide a complete representation of the motion and intensity variations of the video object throughout the image sequence. It also lacks disclosing a recipe as to how to link the parts of the object being tracked that become disjoint because of occlusion by other video objects in the scene.

Mosaicing is used as a means for obtaining an efficient and complete representation of video sequences in M. Irani and et al., "Efficient representations of video sequences and their applications," *Signal Processing: Image Communication*, volume 8, pp. 327–351, 1996. However, in this paper, mosaic construction is described for global transformations only and cannot be used for manipulation of video objects with local motion.

Although the presently known and utilized methods are satisfactory, they are not without drawbacks. Consequently, a need exists for an improved method for mosaicing and tracking an object in an image sequence which is undergoing local motion and intensity variations in the presence of occlusion.

SUMMARY OF THE INVENTION

The present invention provides an improvement designed to satisfy the aforementioned needs. Particularly, the present invention is directed to a computer program product for creating a mosaic from a plurality of images, comprising: a computer readable storage medium having a computer program stored thereon for performing the steps of: (a) receiving the plurality of images; (b) forming a mesh on each of the plurality of images for permitting tracking of local motion in the images; and (c) creating a mosaic from the plurality of images based on local motion described by the meshes.

BRIEF DESCRIPTION OF THE DRAWINGS

In the course of the following detailed description, reference will be made to the attached drawings in which.

It is an object of the present invention to provide a mosaicing technique that permits local motion as opposed to global transformations of the object, occlusions by another object, and out-of-plane rotations of the object that result in self-occlusions.

DETAILED DESCRIPTION OF THE INVENTION

Before describing the present invention, it will facilitate understanding to have an understanding of the following terms. A mosaic of a video object is defined as a single picture that captures all the views of a video object that is present in the image sequence. Occlusion refers to a partial view of a video object being covered, i.e., made invisible, by another video object or by the motion of the video object itself. 2-D triangular mesh refers to a connected set of triangular patches whose corners form the nodes of the mesh.

Figure 1:
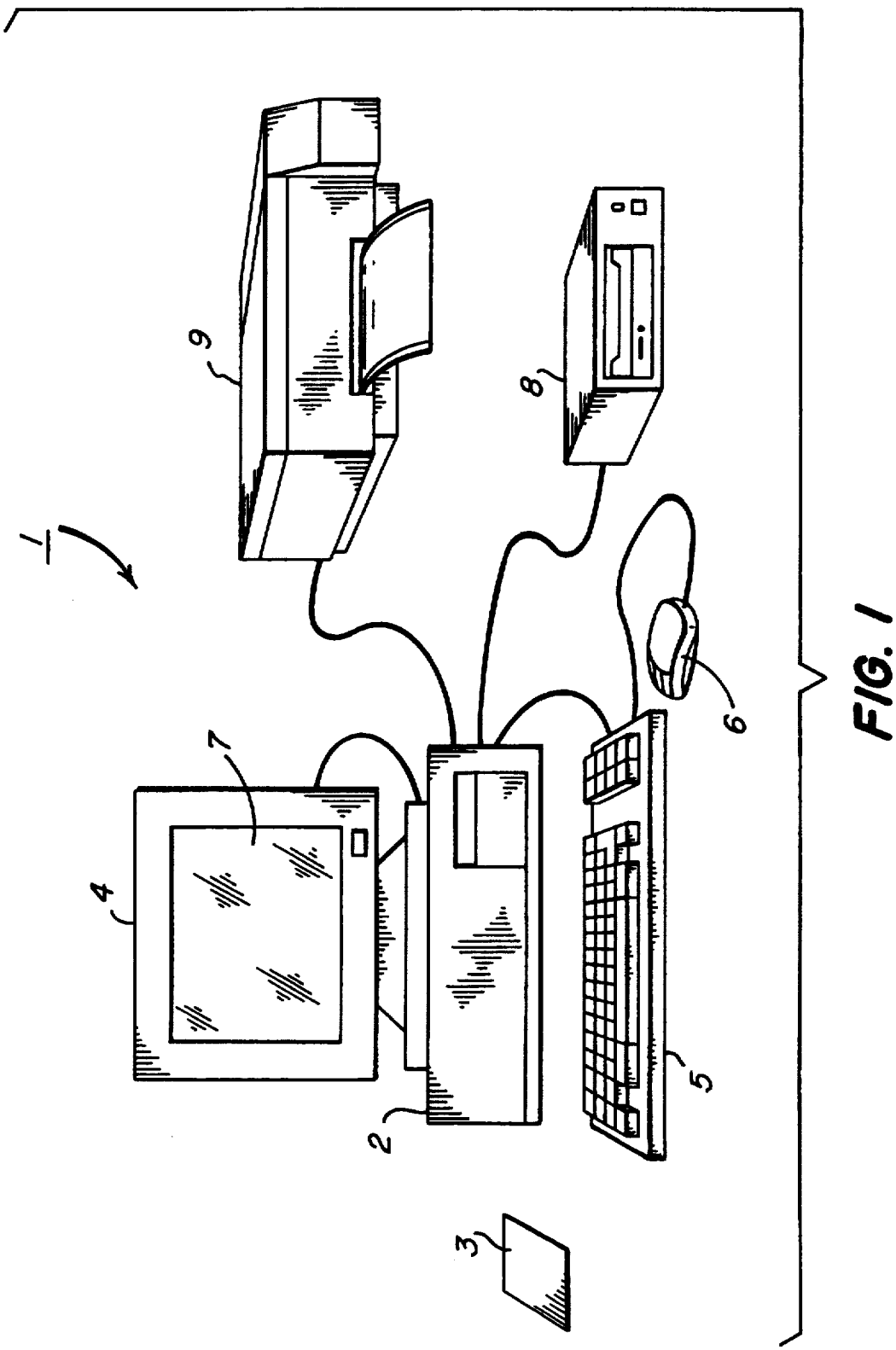
FIG. 1 is a perspective view of a computer system for implementing the present invention.

Referring to FIG. 1, there is illustrated a computer system 1 for implementing the present invention. Although the computer system 1 is shown for the purpose of illustrating a preferred embodiment, the present invention is not limited to the computer system 1 shown, but may be used on any electronic processing system (for example a SPARC-20 workstation). The computer system 1 includes a microprocessor based unit 2 for receiving and processing software programs and for performing other well known processing functions. The software programs are contained on a computer usable medium 3, typically a disk typically, and are inputted into the microprocessor based unit 2 via the disk 3. A display 4 is electronically connected to the microprocessor based unit 2 for displaying user related information associated with the software. A keyboard 5 is also connected to the microprocessor based unit 2 for allowing a user to input information to the software. As an alternative to using the keyboard 5, a mouse 6 may be used for moving an icon 7 on the display 4 and for selecting an item on which the icon 7 overlays, as is well known in the art. A compact disk—read only memory (CD-ROM) 8 is connected to the microprocessor based unit 1 for receiving software programs and for providing a means of inputting the software programs and other information to the microprocessor based unit 1. A compact disk (not shown) typically contains the software program for inputting into the CD-ROM 9. A printer 9 is connected to the microprocessor based unit 2 for printing a hard-copy of the output of the computer system 1.

Figure 2:
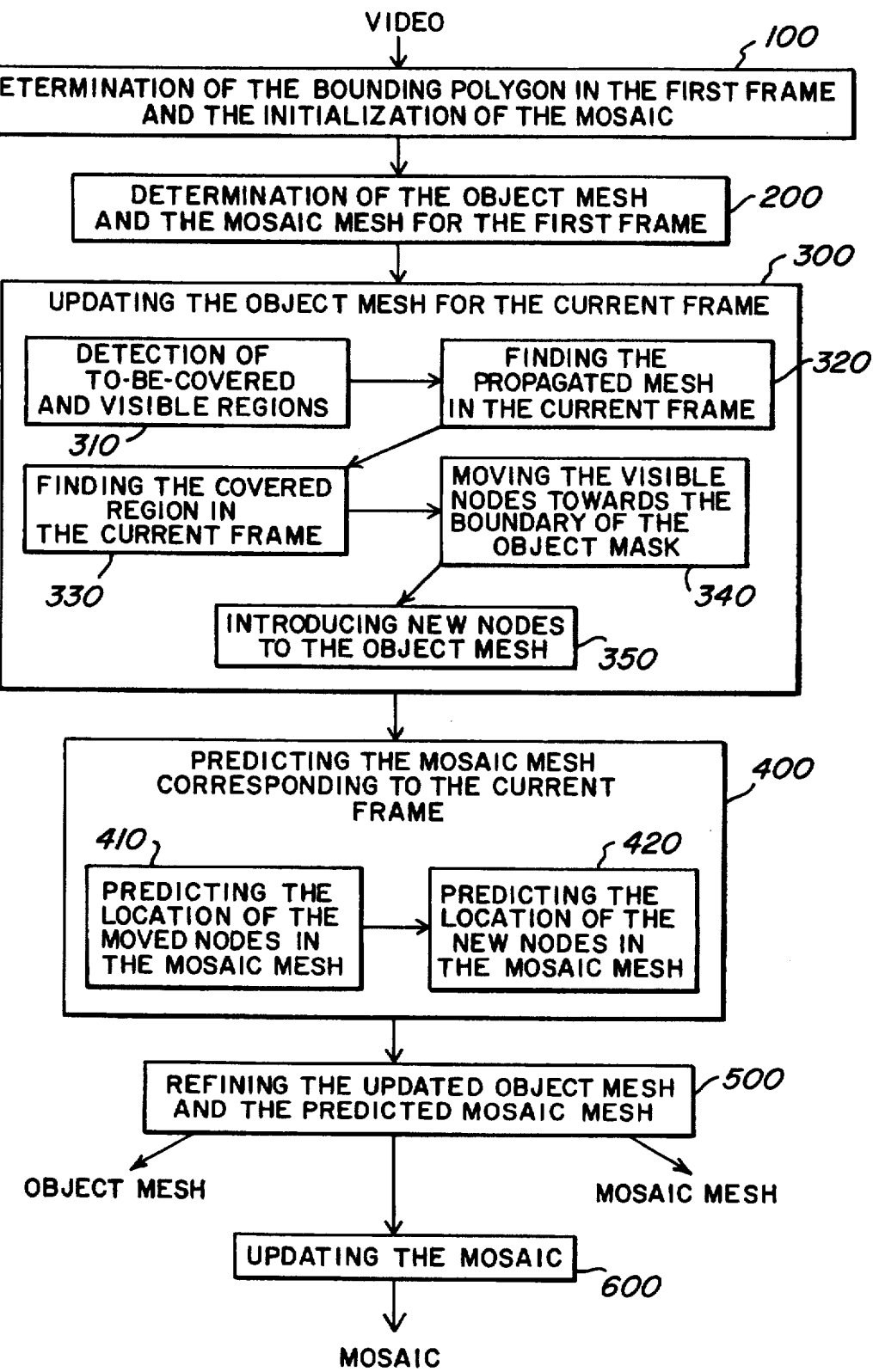
FIG. 2 is a flowchart for the method of the present invention.

The below-described steps of the present invention are implemented on the computer system 1, and are typically contained on a disk 3 or other well known computer usable medium. Referring to FIGS. 2 and 3, there are illustrated the six steps of the present invention which are first succinctly outlined and later described in detail. Briefly stated, six steps are as follows: (i) determination of the polygon in the first frame, and initialization of the mosaic (Step 100); (ii) determination of the object mesh and the mosaic mesh for the first frame (Step 200); (iii) updating the object mesh for the current frame (Step 300); (iv) updating the mosaic mesh for the current frame (Step 400); (v) refining the updated object mesh and the updated mosaic mesh (Step 500) for the current frame; (vi) updating the mosaic (Step 600).

A. Determination Of The Polygon In The First Frame And The Initialization Of The Mosaic (Step 100)

Referring to FIGS. 2 and 3, in the first step 100, the boundary of the object of interest, hereinafter referred to as the object mask 120, in the first frame is approximated by a polygon 130, hereinafter referred to as the polygon, using the method in Y. Altunbasak and A. M. Tekalp, "Occlusion-adaptive content-based 2-D mesh design and tracking for object-based coding," *IEEE Transactions on Image Processing*, volume 6, no. 9, September 1997. It facilitates understanding to note that the polygon 130 should sufficiently approximate the boundary of the object mask 120 which may be curved. The object mask 120 for the first frame is provided by the user. The object mask in any subsequent frame can also be provided by the user, or otherwise obtained by motion tracking the boundary of the object mask using a boundary tracking method such as the one described in C. Toklu, A. M. Tekalp, and A. T. Erdem, "2-D triangular mesh-based mosaicing for object tracking in the presence of occlusion," *SPIE/IS&T Symposium on Electronic Imaging Science & Technology*, volume 3024, part 1, pp. 328–337, San Jose, Calif., February 1996.

Figure 3A:
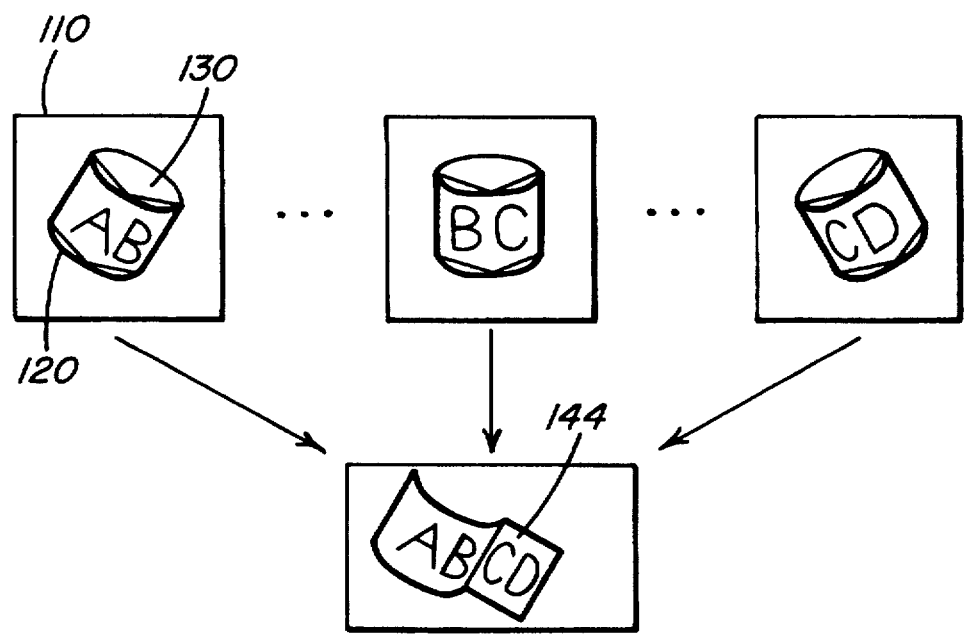
FIG. 3 is a diagram illustrating the method of FIG. 2.
Figure 3B:
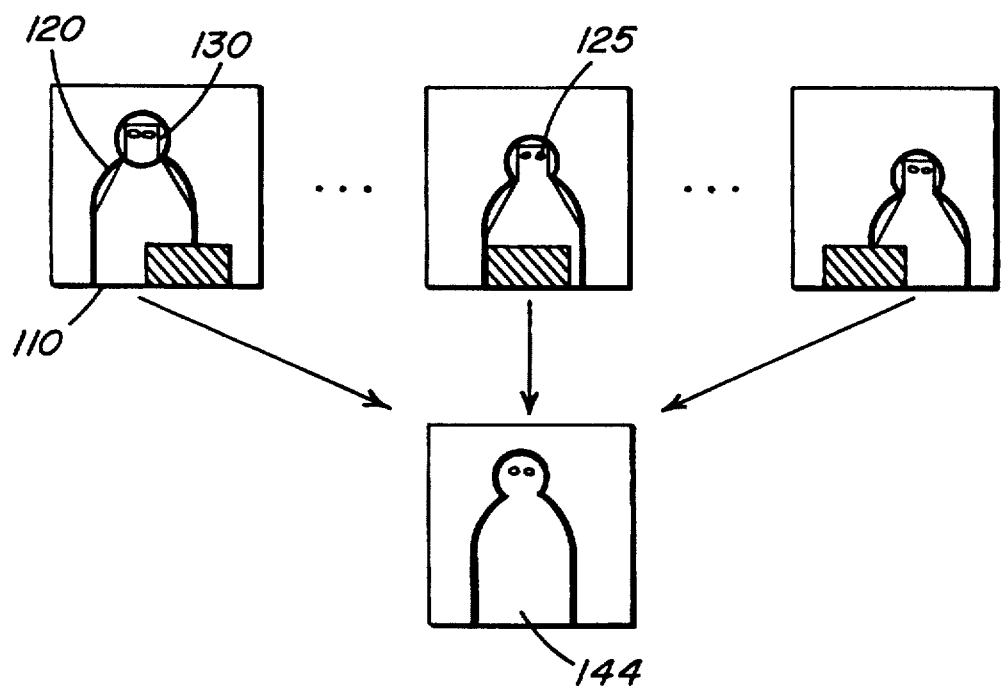
Figure 4:
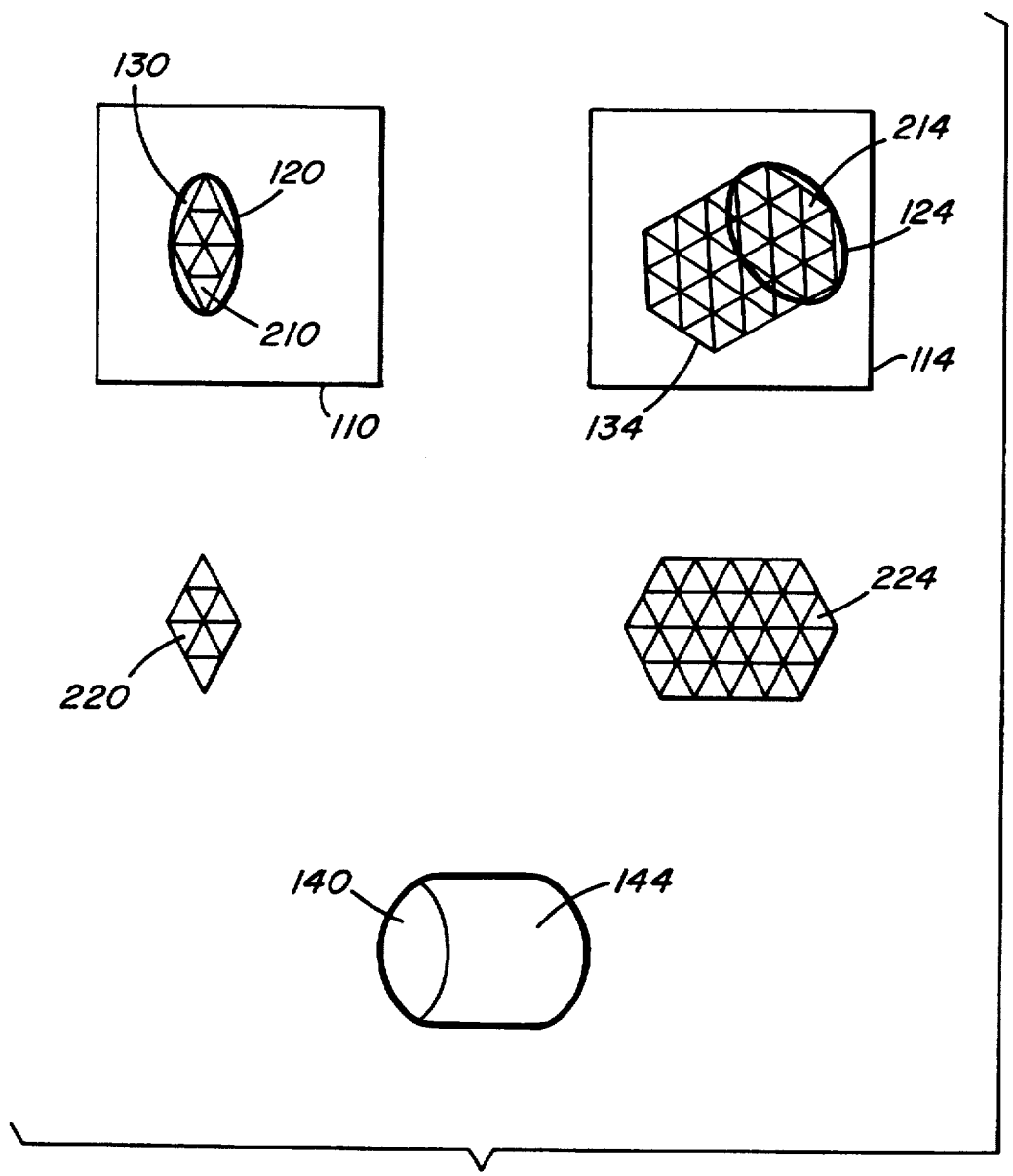
FIG. 4 is a diagram further illustrating the method of FIG. 2.

Referring to FIGS. 3 and 4, the mosaic 140 begins its creation, or is initialized, with a duplicate copy of the image data in the object mask 120. The mosaic will be further constructed by the addition of the new object image data that become visible with the introduction of every subsequent frame.

It is instructive at this point to clarify some of the notation used herein, which is as follows. The first frame 110 of the sequence is denoted by $F_1$. The nth frame 114 of the sequence is denoted by $F_n$. The object mask 120 in the first frame 110 is denoted by $S_1$ and the object mask 124 in the nth frame 114 is denoted by $S_n$. It facilitates understanding to note that the object mask in any frame may include self-occlusion regions such as those generated by the closing of the eye-lids on a persons face. (FIG. 3b illustrates such an example) The polygon 134 in the nth frame 114 is denoted by $P_n$. The determination of $P_n$ for n>1 will be described later. The mosaic 144 obtained after the introduction of nth subsequent frame 124 is denoted by $M_n$.

B. Determination Of The Object Mesh And The Mosaic Mesh For The First Frame (Step 200)

Referring to FIG. 4, a content-based adaptive triangular 2-D mesh $OM_1$ 210, called the first object mesh, is fitted inside the first polygon $P_1$ 130 using the method in Y. Altunbasak and A. M. Tekalp, "Occlusion-adaptive content-based 2-D mesh design and tracking for object-based coding," *IEEE Transactions on Image Processing*, volume 6, no. 9, September 1997. The object mesh inside the nth polygon $P_n$ 134 is denoted by $MN_n$ 214. The determination of $OM_1$ for n>1 will be described later.

The first mosaic mesh $MM_1$ 220 is defined to be the mesh corresponding to the mosaic $M_1$ 140. The first mosaic mesh $MM_1$ 220 is identical to the first object mesh $OM_1$ 210. The mosaic mesh corresponding to the mosaic $M_n$ 144 is denoted by $MM_n$ 224. The determination of $MM_n$ for n>1 will be described later. In general, $MM_n$ and $OM_n$ will be different for n>1.

C. Updating The Object Mesh For The Current Frame (Step 300)

Figure 5:
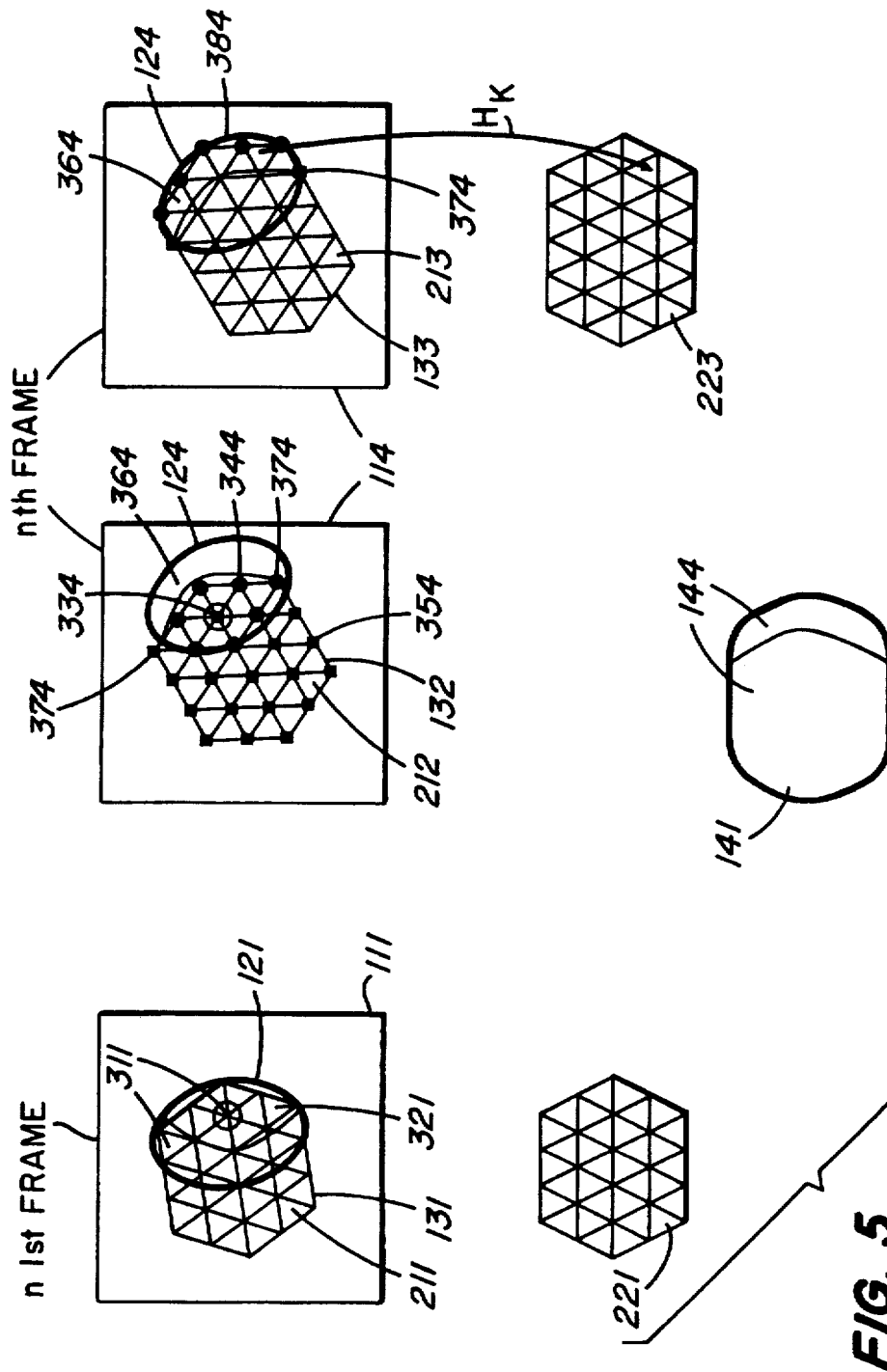
FIG. 5 is a diagram further illustrating the method of FIG. 2.

Referring to FIG. 5, updating the object mesh 211 of the previous frame 111 for subsequent frame $F_n$ which is now the current frame 114 being analyzed involves predicting the locations of its nodes in the current frame 114 and introducing new nodes to it based on the new image information that may become available in the current frame 114. Hereinafter, the n-1st frame $F_{n-1}$ and the nth frame $F_n$ are referred to as the previous frame 111 and the current frame 114, respectively. The method of updating the object mesh 212 in the current frame includes the following steps: (1) detecting the to-be-covered region 311 and the visible region 321 in the previous frame 111 (Step 310), (2) finding the propagated object mesh 212 in the current frame 114 (Step 320), (3) finding the covered region 334 in the current frame 114 (Step 330), (4) moving the visible nodes 344 towards the boundary of the object mask 124 (Step 340), (5) introducing new nodes to the object mesh 212 (Step 350). In the following, a detailed description of these steps are given.

C1. Detection Of To-Be-Covered And Visible Regions (Step 310)

Still referring to FIG. 5, the to-be-covered region 311 is a portion of the object that disappears in the immediate subsequent frame due to self-occlusion or occlusion by another object. The portion of the object that is still visible in the immediate subsequent frame is referred to as the visible region 321. The to-be-covered region 311 and visible region 321 in the previous frame $F_{n-1}$ 111 are denoted by $TC_{n-1}$ and $VR_{n-1}$, respectively. Hence, in mathematical terms, $$VR_{n-1} = S_{n-1} - TC_{n-1}.$$

The to-be-covered region $TC_{n-1}$ 311 is determined as follows. First, the motion vector for every pixel in the object mask $S_{n-1}$ 121 is estimated. This is done preferably using motion estimation method as described in commonly assigned U.S. Pat. No. 5,241,608, although any dense motion estimation algorithm may be used. The motion vector estimated for a pixel indicates where that pixel has moved in the immediate subsequent frame. Then, the motion residual for every pixel located inside the object mask $S_{n-1}$ 121 is calculated and thresholded to obtain the to-be-covered region 311. The residual at pixel location (i,j) is denoted by r(i,j) and is defined as $$r(i,j) = I_n(i,j) - I_{n-1}(i+u(i,j), j+v(i,j)),$$

where $I_{n-1}(i,j)$ denotes the image intensity at location (i,j) in the nth frame; and u(i,j) and v(i,j) denote the horizontal and vertical components of the motion vector corresponding to the pixel at location (i,j) in the nth frame. If $|r(i,j)| > T$, where T is a error threshold, then it is decided that the pixel at location (i,j) belongs to the to-be-covered region. A preferable method to determine the error threshold T models the residuals as a contaminated Gaussian distribution, where the residuals for the to-be-covered region 311 are contaminants. An estimate σ of the standard deviation of the contaminated Gaussian distribution is obtained as the median absolute deviation given as $$\sigma = 1.4826 \, \mathrm{median}\{|r(i,j) - \mathrm{median}\{r(k,l):(k,l)\in S\}|:(i,j)\in S\}$$

The error threshold T is set to 4σ. This thresholding operation usually yields superfluous to-be-covered and visible regions. In order to eliminate such superfluous regions, it is advisable to employ small cluster elimination and median filtering operations on the estimated to-be-covered and visible regions.

C2. Finding The Propagated Mesh 212 In The Current Frame 114 (Step 320)

The propagated object mesh $\hat{OM}_n$ 212 in the current frame 114 is defined to be the predicted version of the object mesh $OM_{n-1}$ 211 in the previous frame 111. The prediction is based on the motion vectors found for the nodes of the object mesh $\hat{OM}_{n-1}$ 211 in the previous frame. The propagation is constrained so that the mesh topology is preserved. The propagated polygon $\hat{P}_n$ 132 is defined to be the boundary of the propagated object mesh $\hat{OM}_n$ 212.

Nodes of the object mesh $OM_{n-1}$ 211 in $VR_{n-1}$ 321 are moved with the estimated motion vectors found in step C1. The remaining nodes of $OM_{n-1}$ 211 are moved with motion vectors predicted preferably by fitting an affine model to the temporal trajectory of the nodes in the least squares sense as described below. Letting $(x_n, y_n)$ denote the coordinates of a node in the nth frame, and denoting the affine parameters for the node by $(a_1, a_2, a_3, a_4, a_5, a_6)$, the following set of equations $$\begin{bmatrix} x_i \\ y_i \end{bmatrix} = \begin{bmatrix} 1+a_1 & a_2 \\ a_4 & 1+a_5 \end{bmatrix} \begin{bmatrix} x_{i-1} \\ y_{i-1} \end{bmatrix} + \begin{bmatrix} a_3 \\ a_6 \end{bmatrix}, \; i = n-1, n-2, n-3,$$

is solved for $(a_1, a_2, a_3, a_4, a_5, a_6)$ given $(x_{n-1}, y_{n-1})$, $(x_{n-2}, y_{n-2})$, and $(x_{n-3}, y_{n-3})$. It is instructive to note that $(x_{n-1}, y_{n-1})$, $(x_{n-2}, y_{n-2})$, and $(x_{n-3}, y_{n-3})$ denote the locations of the node in the n-1st, n-2nd, and n-3rd frames respectively. If the node is does not yet exist in any one of these frames, then its location in the nth frame is linearly interpolated from the locations of the neighboring nodes in the propagated object mesh 212.

C3. Finding The Covered Region 334 In The Current Frame 114 (Step 330)

Still referring to FIG. 5, the covered region $CR_n$ 334 in the current frame $F_n$ 114 is found. This is the region inside the object mask 124 that gets covered because of self-occlusion, as illustrated in FIG. 3b. If there is no self-occlusion inside the object mask 124, the covered region will be empty.

In order to find the covered region 334, the image data in the mosaic $M_{n-1}$ 141 is warped into the current frame $F_n$ 114, using the mapping. This warping is done from the mosaic mesh $MM_{n-1}$ 223 onto the object mesh $\hat{OM}_n$ 213 on a patch-by-patch basis, that is, the image data inside a triangular patch of the mosaic mesh 221 is warped onto the corresponding triangular patch of the propagated object mesh 212 using the affine transformation between the two triangular patches. The determination of the affine transformation between two triangular patches and the method of warping of image data using an affine transformation are described in "S. Wolberg." Then, the difference between the warped image data and the original image data is computed for every pixel within the intersection $S_n \cap \hat{P}_n$. It facilitates understanding to let r(i,j) denote this difference at pixel location (i,j) in $S_n$. Similar to the case of determining to-be-covered region 311, the difference r(i,j) is compared to a threshold T and if |r(i,j)|>T, then it is decided that the pixel at location (i,j) belongs to the covered region 334. A preferable method to determine the error threshold T is already explained in step C1 310, where, in this case, the residuals for the covered region 334 are the contaminants. This thresholding operation usually yields superfluous covered regions. In order to eliminate such superfluous covered regions, it is advisable to employ small cluster elimination and median filtering operations on the estimated covered regions. The covered region 334 is denoted by $CR_n$. The difference $S_n$-$\hat{P}_n$ is called the uncovered region and denoted by $UR_n$ 364. This region contains image data that was not available in the preceding frames.

Nodes of $\hat{OM}_n$ 212 that fall inside the difference $S_n$-$CR_n$ are called the visible nodes and denoted by $VN_n$ 344. All the remaining nodes are called the occluded nodes and are denoted by $ON_n$ 354.

C4. Moving The Visible Nodes 344 Towards The Boundary Of The Object Mask 124 (Step 340)

Figure 6A:
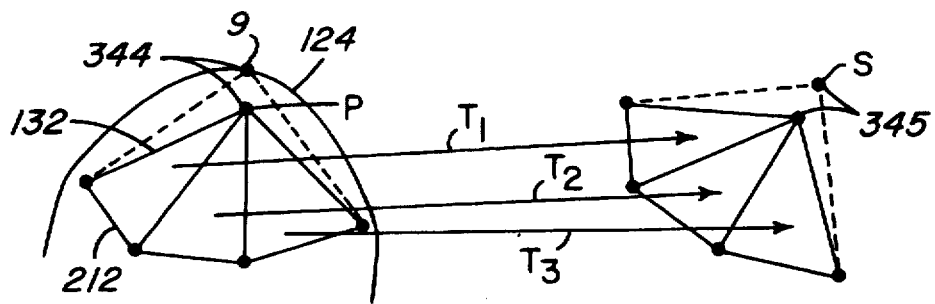
FIG. 6 is a diagram illustrating the method for adding new nodes to the object mesh of FIG. 2.

Referring to FIGS. 5 and 6a, in order to extend the propagated mesh 212 to include the uncovered region 364, the visible nodes 344 that are on the polygon $\hat{P}_n$ 132 but not on the boundary of the object mask 124 are moved to a pixel location on the boundary of the object mask 124. At this point, it facilitates understanding to let $MN_n$ denote the visible nodes that are to-be-moved to a pixel location on the boundary of the object mask 124, and to let $C_n$ denote the chain code representation of the boundary of $S_n$. Given $S_n$, $C_n$ can be found using a ray tracing algorithm, which is well-known to anyone skilled in the art. Thus, $C_n$ is the collection of points that correspond to the locations of the pixels that lie on the boundary of $S_n$.

Letting p denote the location of any to-be-moved node and letting q denote its new location on the boundary of the object mask 124, the new location q is determined as follows: Let K denote the number of patches in the object mesh 212 that have the to-be-moved node 344 as one of their vertices, and let $T_k$, k=1, ... ,K, denote the affine mappings between these patches and the corresponding patches in the mosaic mesh 221. The new location q is determined in such a way that these affine mappings are minimally affected by the change in the location of the to-be-moved node 344. In mathematical terms, the new location q is such that $$\sum_{k=1}^{K}\left[T_k(q) - \frac{1}{K}\sum_{i=1}^{K}T_i(q)\right]^2 \leq \sum_{k=1}^{K}\left[T_k(r) - \frac{1}{K}\sum_{i=1}^{K}T_i(r)\right]^2,$$

where r denotes the location of any pixel on $C_n$.

C5. Introducing New Nodes To The Object Mesh (Step 350)

Figure 6B:
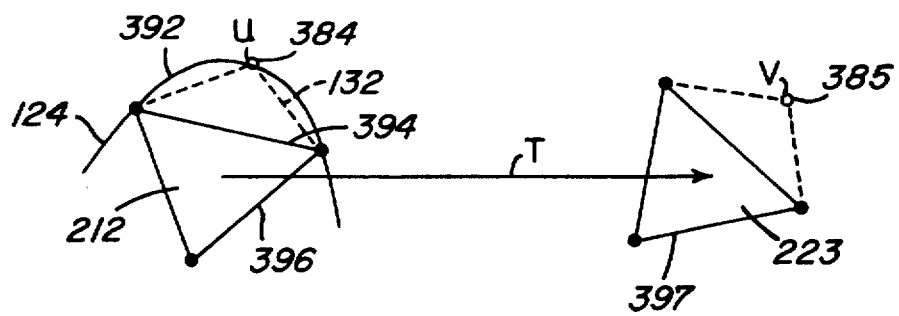

Referring to FIG. 6b, after Step 340 is completed, new nodes are introduced to the object mesh 212 on the boundary of the object mask 124, so that the maximum distance between the boundary of the object mask 212 and the polygon 132 is not more than a certain threshold. This is done as follows: if the maximum distance between the arc 392 and the line 394 is above a certain threshold, then a new node 384 is introduced on the arc 392 that has the maximum distance from the line 394. Hence, the object mesh 212 and the polygon 132 are further updated by the introduction of a new node 384 and two new lines 396 (illustrated as dashed lines in FIG. 6b). A preferable value for the threshold is 5 pixels, although numbers that are smaller or larger than 5 are also allowed.

Figure 6C:
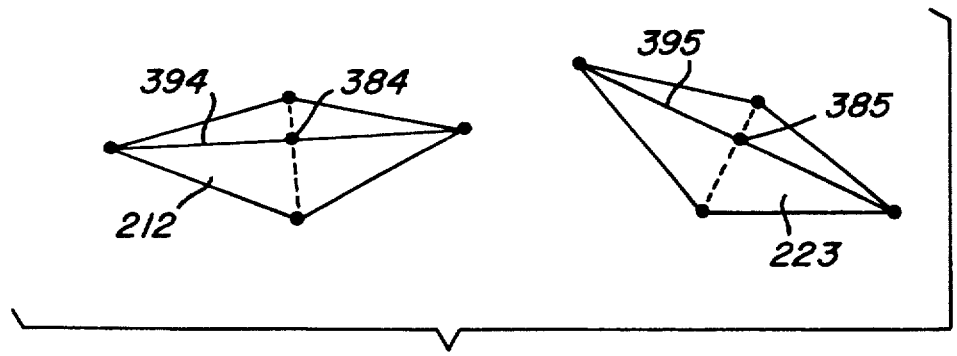

Referring to FIG. 6c, new nodes are also introduced along the lines connecting the nodes when the length of these lines exceed a certain threshold. Such lines are divided into two equal-length pieces, so that the length of the lines connecting the nodes are not larger than the threshold. This is done as follows: if the length of the line 394 is larger than a certain threshold, then a new node 384 is introduced in the middle of the line 394 dividing the line 394 into two equal pieces. Hence, the object mesh 212 is further updated by the introduction of a new node 384 and two new lines 396. A preferable value for the threshold is 10 pixels, although numbers that are smaller or larger than 10 are also allowed.

At this point, it facilitates understanding that the collection of newly added nodes is denoted by $NN_n$ 374, and the polygon enclosing the updated object mesh $OM_n$ 213 is called the updated polygon and is denoted by $\hat{P}_n$ 133.

D. Predicting The Mosaic Mesh 223 Corresponding To The Current Frame 114 (Step 400)

Referring to FIG. 5, the prediction of the mosaic mesh includes the following steps: (1) predicting the location of the moved nodes 374 in the mosaic mesh 223 (Step 410) and (2) predicting the location of the new nodes 384 in the mosaic mesh 223 (Step 420). A detailed description of these steps are given in the following. The mesh obtained using the following steps is called predicted mosaic mesh, and denoted by $\tilde{MM}_n$ 223.

D1. Predicting The Location Of The Moved Nodes 374 In The Mosaic Mesh 223 (Step 410)

The nodes of the mosaic mesh $\tilde{MM}_{n-1}$ 221 that correspond to the moved nodes $MN_n$ 374 of the object mesh 133 are moved by using the appropriate transformations as described in the following. Referring to FIG. 6a, let q denote the new location of any moved node 374 on the boundary of the object mask 124, and s denote the new location of the corresponding node 345 on the mosaic mesh 223. Then, let K denote the number of patches in the object mesh 212 that have the moved node 374 as one of their vertices, and let $T_k$, k=1, ... ,K, denote the affine mappings between these patches and the corresponding patches in the mosaic mesh 221. The new location s 345 is given by $$s = \frac{1}{K}\sum_{i=1}^{K} T_i(q).$$

This is illustrated in FIG. 6a with k=3.

D2. Predicting The Location Of The New Nodes 384 In The Mosaic Mesh 221 (Step 420)

New nodes are introduced in the mosaic mesh 223 corresponding to the new nodes $NN_n$ 384. Referring to FIG. 6b, the location v of any new node 385 on the mosaic mesh 223 corresponding to the new node 384 on the boundary of the object support 124 is determined as follows. Let u denote the location of the new node 384 in the object mosaic 212, and let T denote the affine transformation from the triangle patch 396 neighboring the new node 384 to the corresponding triangle patch 397 in the mosaic mesh 223. The new location v 385 is given by v=T(u).

Referring to FIG. 6c, the location of any new node 385 on the mosaic mesh 223 corresponding to the new node 384 on line 394 is determined as the mid point 385 of the corresponding line 395.

E. Refining The Updated Object Mesh And The Predicted Mosaic Mesh (Step 500)

Hexagonal search is used to refine the locations of the moved and newly introduced nodes in the predicted mosaic mesh $MM_n$ 223 and the locations of the remaining nodes in the updated object mesh$MM_n$ 213. Local intensity variations are also computed and stored in association with every node of each object mosaic. The hexagonal search method and the method for computing the local intensity variations are disclosed in commonly assigned U.S. patent application Ser. No. 08/636,622. Prediction error is computed only within $S_n$ 124. The resulting meshes are called the refined object and mosaic meshes and denoted by $OM_n$ 214 and $MM_n$ 224, respectively.

F. Updating The Mosaic (Step 600)

Referring to FIG. 5, let K denote the number of patches in the uncovered region 364 in the object mesh 213, and let $H_k$, k=1, ... ,K, denote the affine transformations between these patches and the corresponding patches in the mosaic mesh 223. Then, the image data in each of the patches in the uncovered region 364 is warped onto the corresponding patches in the mosaic mesh 223 to update the mosaic 144 using the respective affine transformations. The method of warping using an affine transformation is described in "S. Wolberg."

Synthetic Object Transfiguration

Figure 7A:
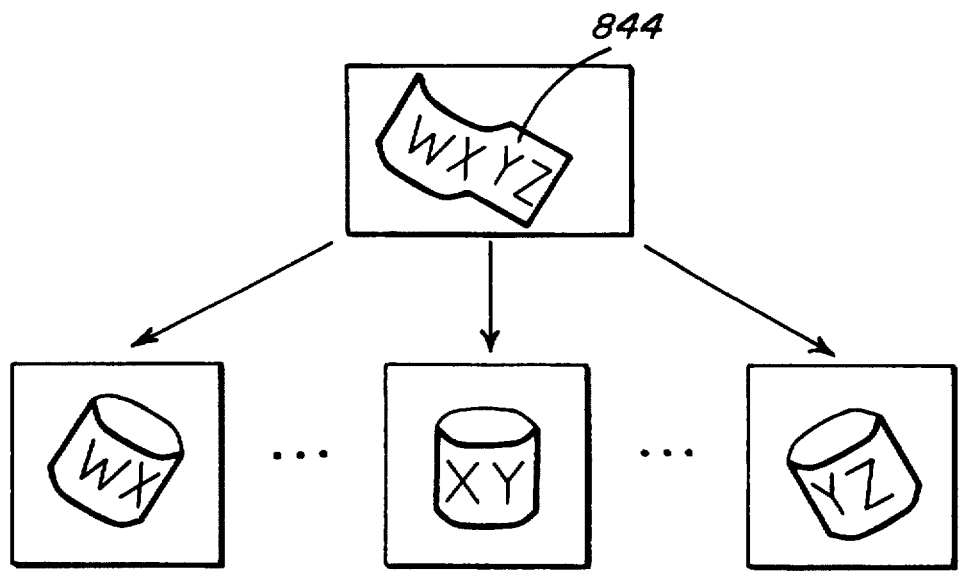
FIG. 7 is a diagram illustrating the method of synthetic object transfiguration.
Figure 7B:
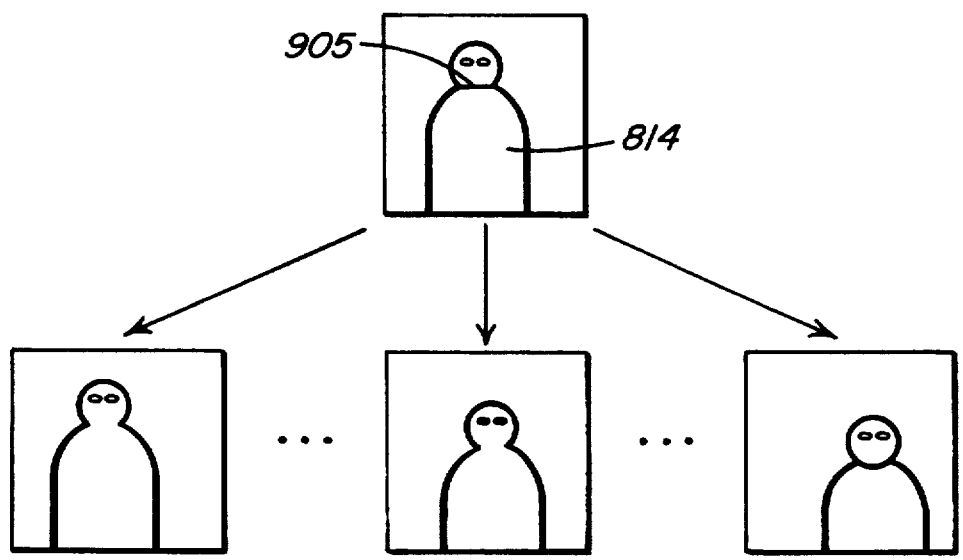

Referring to FIGS. 3a and 7a, one important application of the present invention is in the area of synthetic object transfiguration where a video object, such as label "ABCD" on a rotating bottle, is replaced by a new label "WXYZ" and rendered throughout the image sequence in the same manner as the original label. Referring to FIGS. 3b and 7b, another example to synthetic object transfiguration is removing an occluding object 115 from an image sequence so that the video object of interest always appears in the foreground throughout the image sequence. The application of the presently disclosed object tracking and mosaicing method to synthetic object transfiguration is described below.

Figure 8:
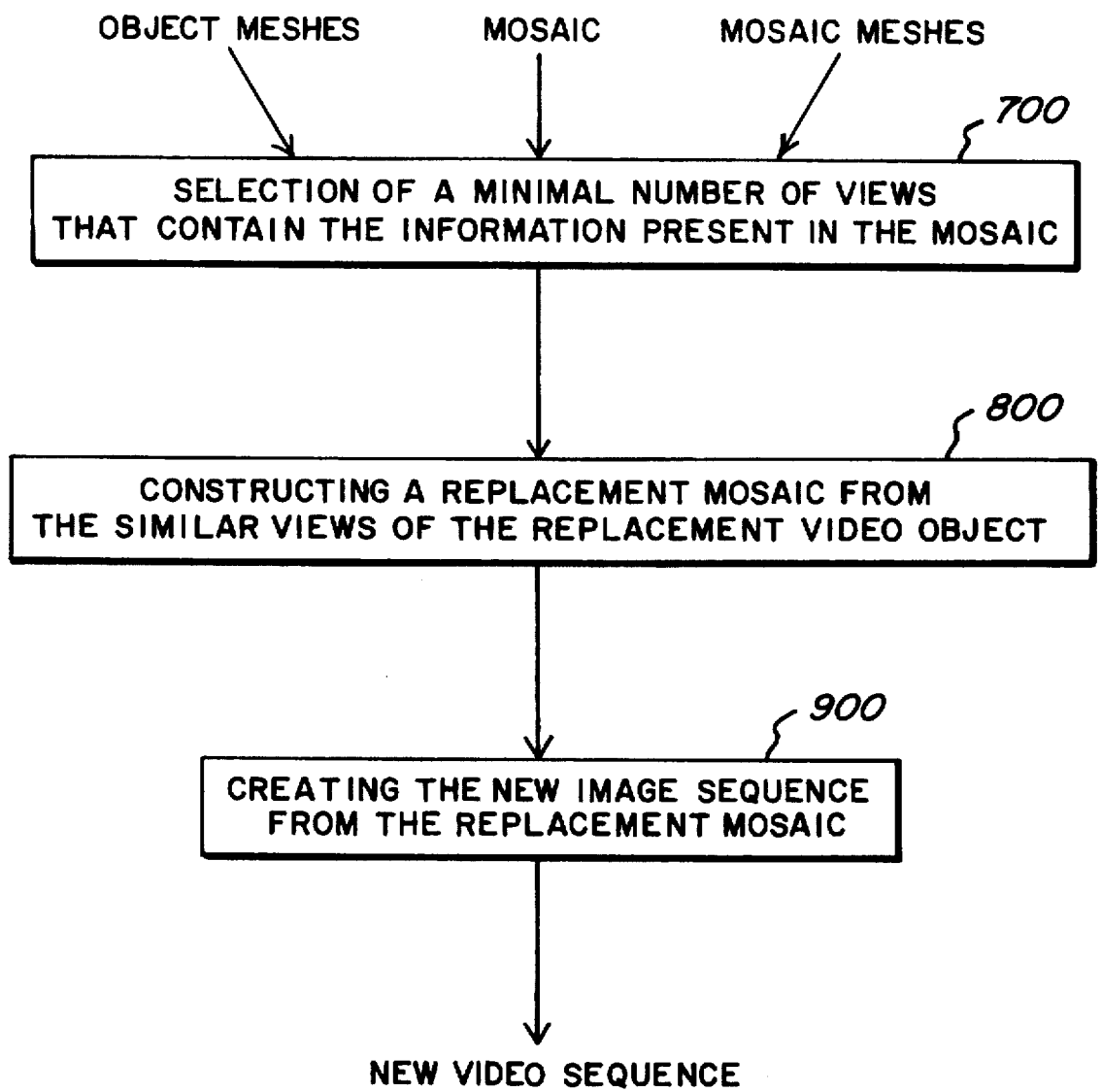
FIG. 8 is a flowchart for the method of FIG. 7.

Referring to FIG. 8, the method of transfiguration using the mosaic 144 involves the following steps: (i) selection of a minimal number of frames, or views, that contain the information present in the mosaic (Step 700), (ii) constructing a replacement mosaic from the similar views of the replacement video object (Step 800), (iii) creating the new image sequence from the replacement mosaic (Step 900). These steps are described in detail in the following.

A. Selection Of A Minimal Number Of Frames, Or Views, That Contain The Information Present In The Mosaic (Step 700)

Given the mosaic 144, the mosaic mesh 223 and object mesh 212 for every frame in the image sequence, an index set for every pixel in the mosaic 144 is constructed from the indices of the frames where the pixel is visible. At this point it facilitates understanding to let $L_m$ denote the index set obtained for the m th pixel in the mosaic 144, M denote the number of pixels in the mosaic 144 and N denote the number of frames in the image sequence. The frame whose index appears the most in the sets $L_m$, m=1, ... M, is selected as the first view for transfiguration. The index sets that have the index of this frame as one of their members are dropped from further consideration. The frame whose index appears the most in the remaining sets is selected as the second view for transfiguration. This process is continued until the index of a selected frame appears in less than a predetermined number of remaining index sets. This frame is not selected as the next view, and the view selection process is ended.

B. Constructing A Replacement Mosaic From The Similar Views Of The Replacement Video Object (Step 800)

Figure 9:
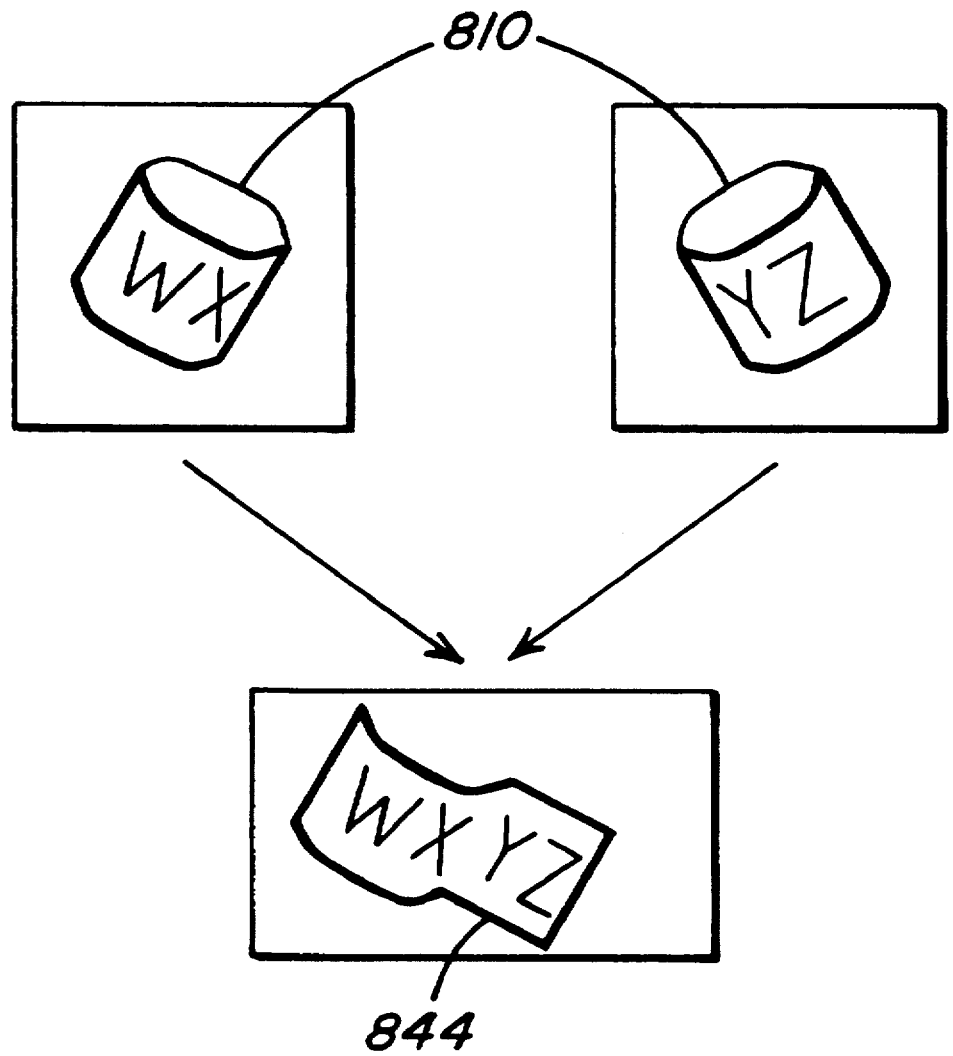
FIG. 9 is a diagram illustrating the construction of the replacement mosaic.

Letting K denote the number of selected views, and letting $i_k$, k=1, ... ,K, denote the indices of the frames that are selected as the views for transfiguration, a replacement mosaic is constructed as follows. An example is illustrated in FIG. 9, where the replacement mosaic 844 is constructed from two selected views 811, 812 of the replacement object.

Figure 10:
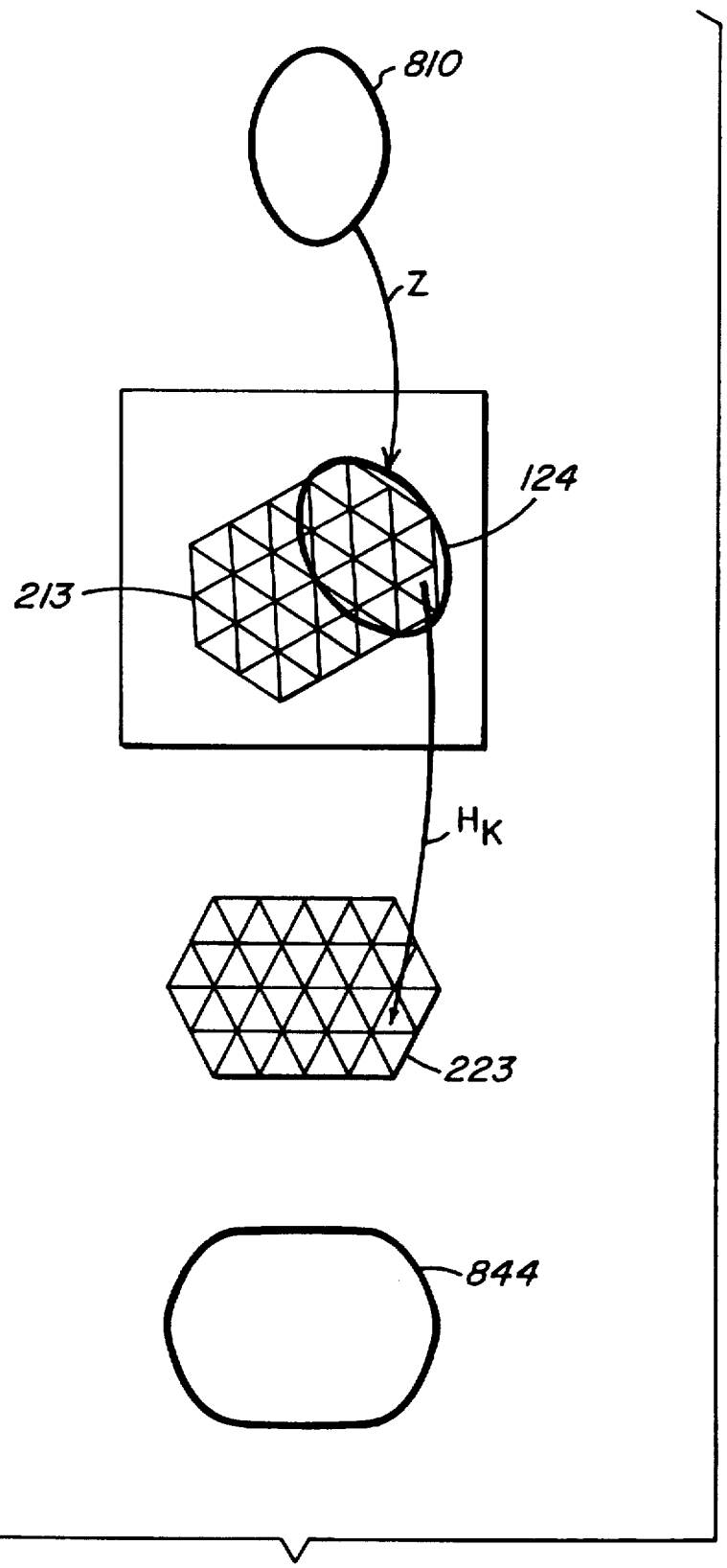
FIG. 10 is a diagram further illustrating the method of FIG. 9.

Referring to FIG. 10, it is assumed that the user has the still images of the replacement object corresponding to the selected views 810 of the original object 124 that is to be replaced. It is also assumed that only a global spatial transformation Z exists between the replacement object 810 and the object 124 that is to-be-replaced in each of the selected views 810. Let K denote the number of triangular patches belonging to the object 124 that is to be replaced, and let $H_k$, k=1, ... ,K, denote the affine transformations between these patches and the corresponding patches in the mosaic mesh 223. Then, the image data in the replacement object 810 is warped into the replacement mosaic 844 on a patch-by-patch basis using the combined affine transformations $H_k Z$, k=1, ... ,K. The method of warping using an affine transformation is described in "S. Wolberg." The intensity value of every pixel on the mosaic 144 that is not accounted for during the selection of the views is spatially interpolated from the neighboring pixels.

C. Creating The New Image Sequence From The Replacement Mosaic (Step 900)

Figure 11:
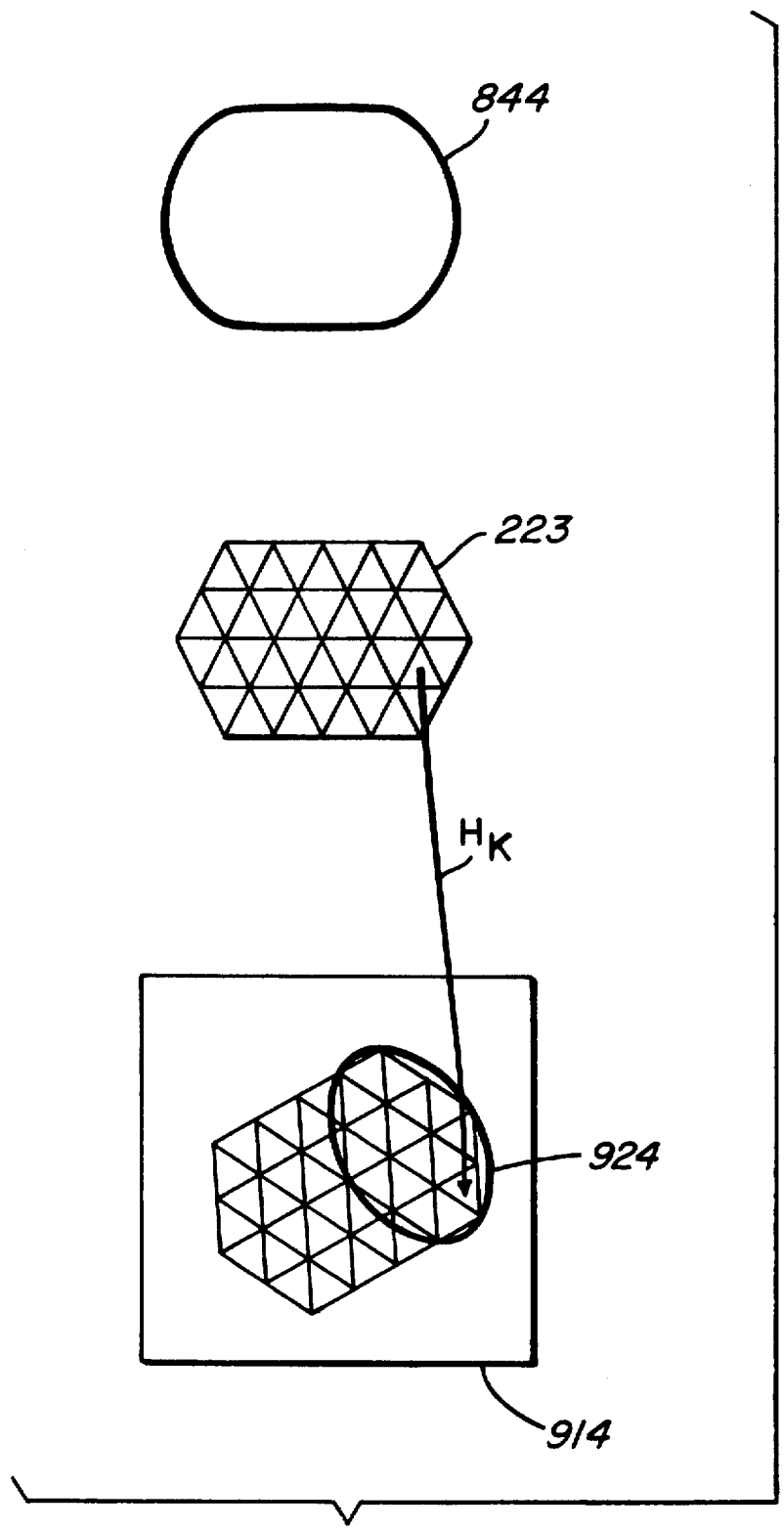
FIG. 11 is a diagram illustrating the method of creating a new image from the replacement mosaic.

Finally, referring to FIGS. 7 and 11, the replacement mosaic 844 is used for rendering the motion and intensity variations of the replacement object 810 into every frame 914 of the given image sequence to achieve its transfiguration. Let K denote the number of triangular patches belonging to the object 124 that is to be replaced, and let $H_k$, k=1, ... ,K, denote the affine transformations to these patches from the corresponding patches in the mosaic mesh 223. Then, the image data within the region 924 to-be-replaced is obtained by warping the image data from the replacement mosaic 844 on a patch-by-patch basis using the affine transformations $H_k$, k=1, . . . ,K. The method of warping using an affine transformation is described in "S. Wolberg." Referring to FIG. 7b, it is also possible to realize the transfiguration of the replacement mosaic 844 within a subregion 905 of the region 924 to-be-replaced. This will retain the original image data pertaining to the eye-lids of person while removing the occluding object 115 (illustrated in FIG. 3) from the scene.

The invention has been described in detail with particular reference to certain preferred embodiments thereof, but it will be understood that variations and modifications can be effected within the spirit and scope of the invention.

What is claimed is:

1. A computer program product for creating a mosaic from a plurality of images, comprising: a computer readable storage medium having a computer program stored thereon for performing the steps of:

(a) receiving the plurality of images;

(b) forming a mesh on each of the plurality of images for permitting tracking of local motion in the images; and (c) creating a mosaic from the plurality of images based on local motion described by the meshes.

2. The computer program product as in claim 1 further comprising the steps of:

(d) forming a replacement mosaic from selected views of a replacement object; and (e) transfiguring the replacement mosaic for generating a new sequence of images based on local motion described by the meshes.

3. The computer program product as in claim 1, wherein step (c) further includes forming the mesh on an object in the plurality of images and detecting regions that are to be covered by out-of-plane rotations of the object and/or occlusion by another object, and regions that are to remain visible in a subsequent frame.

4. The computer program product as in claim 3, wherein step (c) further includes propagating the object mesh in a subsequent frame.

5. The computer program product as in claim 4, wherein step (c) further includes finding a covered region due to self occlusion in the subsequent frame.

6. The computer program product as in claim 5, wherein step (c) further includes moving visible nodes towards a boundary of the object mesh.

7. The computer program product as in claim 6, wherein step (c) further includes introducing new nodes to the object mesh.

8. The computer program product as in claim 7, wherein step (c) further includes predicting locations of nodes of the mosaic mesh in the subsequent frame from locations of nodes of the object mesh.

9. The computer program product as in claim 8, wherein step (c) further includes refining the object mesh and mosaic mesh in the subsequent frame.

10. The computer program product as in claim 2, wherein step (d) further includes selecting a subset views in the received plurality of images that contain information present in the mosaic.

11. The computer program product as in claim 10, wherein step (c) further includes obtaining views of the replacement object that correspond to the selected subset of views.

12. A method for for creating a mosaic from a plurality of images, the method comprising the steps of:

(a) receiving the plurality of images;

(b) forming a mesh on each of the plurality of images for permitting tracking of local motion in the images; and (c) creating a mosaic from the plurality of images based on local motion described by the meshes.

13. The method as in claim 12 further comprising the steps of:

(d) forming a replacement mosaic from selected views of a replacement object; and (e) transfiguring the replacement mosaic for generating a new sequence of images based on local motion described by the meshes.

14. The method as in claim 13, wherein step (c) further comprises forming the mesh on an object in the plurality of images and detecting regions that are to be covered by out-of-plane rotations of the object and/or occlusion by another object, and regions that are to remain visible in a subsequent frame.

15. The method as in claim 14, wherein step (c) further comprises propagating the object mesh in a subsequent frame.

16. The method as in claim 15, wherein step (c) further comprises finding a covered region due to self occlusion in the subsequent frame.

17. The method as in claim 16, wherein step (c) further comprises moving visible nodes towards a boundary of the object mesh.

18. The method as in claim 17, wherein step (c) further comprises introducing new nodes to the object mesh.

19. The method as in claim 18, wherein step (c) further comprises predicting locations of nodes of the mosaic mesh in the subsequent frame from locations of nodes of the object mesh.

20. The method as in claim 19, wherein step (c) further comprises refining the object mesh and mosaic mesh in the subsequent frame.

21. The method as in claim 13, wherein step (d) further comprising selecting a subset views in the received plurality of images that contain information present in the mosaic.

22. The method as in claim 21, wherein step (d) further comprising obtaining views of the replacement object that correspond to the selected subset of views.

* * * * *